United States Patent
Kwasny et al.

(10) Patent No.: US 7,037,398 B2
(45) Date of Patent: *May 2, 2006

(54) CLEAR PROTECTIVE OVERCOAT FOR A PRINTED MEDIUM

(75) Inventors: David M Kwasny, Corvallis, OR (US); Melissa D. Boyd, Corvallis, OR (US); Mark H. Kowalski, Corvallis, OR (US); Vladek P Kasperchik, Corvallis, OR (US)

(73) Assignee: Hewlett-Packard Development, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/439,993

(22) Filed: May 16, 2003

(65) Prior Publication Data

US 2003/0196747 A1   Oct. 23, 2003

Related U.S. Application Data

(62) Division of application No. 09/629,835, filed on Jul. 31, 2000, now abandoned.

(51) Int. Cl.
*B44C 1/165* (2006.01)
*B65C 9/00* (2006.01)
*B32B 31/20* (2006.01)
*B32B 37/00* (2006.01)
*B41M 3/12* (2006.01)

(52) U.S. Cl. .......... 156/230; 156/238; 156/247; 156/277; 156/289; 156/540; 156/582

(58) Field of Classification Search .......... 156/230, 156/234, 237–241, 277, 247, 289, 540, 580, 156/587, 583.1, 582, 581; 427/146–148; 428/40.1, 41.7, 41.8, 42.3, 343, 195, 200, 428/202, 203, 914

See application file for complete search history.

(56) References Cited

U.S. PATENT DOCUMENTS

| | | | |
|---|---|---|---|
| 4,738,555 A | | 4/1988 | Nagashima |
| 4,861,409 A | * | 8/1989 | Hashida et al. .......... 156/308.2 |
| 5,220,343 A | | 6/1993 | Takanashi et al. |
| 5,427,997 A | | 6/1995 | Oshima et al. |
| 5,486,397 A | * | 1/1996 | Gordon et al. ............ 428/76 |
| 5,555,011 A | | 9/1996 | Tang et al. |
| 5,560,979 A | * | 10/1996 | Bloom et al. ............ 428/195.1 |
| 5,847,738 A | | 12/1998 | Tutt et al. |
| 5,942,330 A | * | 8/1999 | Kelley .................. 428/423.1 |
| 6,095,220 A | * | 8/2000 | Kobayashi et al. ........ 156/540 |
| 6,264,296 B1 | * | 7/2001 | Klinefelter et al. ........ 347/4 |

FOREIGN PATENT DOCUMENTS

| | | |
|---|---|---|
| EP | 0 487 727 | 6/1992 |
| EP | 0 743 192 | 11/1996 |
| EP | 0 775 593 | 5/1997 |

\* cited by examiner

*Primary Examiner*—Sue A. Purvis

(57) ABSTRACT

A transparent, protective overcoat for a printed medium achieved with a thermal transfer material on a carrier ribbon that is heated and pressed to transfer a segment of thermal transfer material from the carrier ribbon onto the printable surface of a medium.

10 Claims, 2 Drawing Sheets

APPLYING

IDLE

CLEAR PROTECTIVE OVERCOAT FOR A PRINTED MEDIUM

CROSS REFERENCE TO THE RELATED APPLICATION(S)

This is a divisional of application Ser. No. 09/629,835 filed on Jul. 31, 2000 ABN, which is hereby incorporated by reference herein.

FIELD OF INVENTION

The present invention, relates to a clear protective overcoat for a printed medium, achieved with a thermal transfer material and a carrier ribbon forming a donor web which is subjected to heat and pressure to transfer a segment of thermal transfer material from the donor web onto the printed area on the printable surface of a medium.

BACKGROUND OF INVENTION

Digital photography and imaging provide cost-effective alternatives for capturing images, but known methods of producing durable, hardcopy prints of digitally printed areas are at least as expensive as traditional photographic methods. Further, with increasing use of various printing and imaging technologies in the publishing industry as well as in the home, protecting imaged or printed documents against abrasion, water alcohol, other liquid spills, ink smear, fading, blocking or other image-degradation processes and effects has become an important consideration. Such protection is particularly desirable for printed or imaged documents produced with water-based (water-soluble) or other liquid inks, as well as documents printed or imaged with toner. These are commonly used in ink-jet printing, offset printing, electrophotography and the like.

Photography provides an easy and reliable way to permanently capture images for a variety of uses. While photographs provide durable images, they are prone to scratches, have poor resistance to light and ultraviolet radiation (which causes photographic images to fade over time), and degrade when exposed to water, other liquids or to vapors of such liquids. Traditional photography uses harsh and expensive chemicals, requires silver recovery, and involves a process requiring several intermediate steps of handling negatives. While photographic processes can be automated, such automatic processing machines are expensive and bulky and do not eliminate the inherent problems of chemical exposure and handling negatives. Additionally, producing large prints (larger than the traditional 3-by-5 inch or 4-by-6 inch prints) can be quite expensive.

Hot and cold laminates are the most common methods used to protect printed areas. However, laminates tend to be expensive, typically costing 6 to 80 cents per square foot for materials. The labor-intensive nature of producing durable prints via lamination also increases the cost of such prints. Laminates may be applied on one or both surfaces of the print. One-sided lamination may lead to excessive curling of the final print, whereas two-sided application can be very expensive in terms of material and labor costs and may excessively increase the thickness of the final print. Adhesives used for cold laminates may be tacky at room temperature, leaving a sticky residue at the edges of the prints. Additionally, binders used in creating cold laminates are typically water-based, which means the print may delaminate if exposed to excessive water or other liquid. Laminates are also susceptible to trapped air pockets, which are viewed as image defects. Most importantly, care must be taken to ensure that the laminates are accurately aligned to the media, and such alignment is especially critical for a continuous web laminate. These are just some of the deficiencies of traditional laminates.

Liquid overcoats are also commonly used to protect photographic prints and are becoming more popular as protective coatings for inkjet printed areas. Typical systems for applying these overcoats rely on roller coating or gravure type systems to dispense, gauge, and apply the coating. Smaller systems typically apply the overcoat off-line, rather than being an integral part of a single printing and coating unit. Larger systems used by the printing industry are in-line, but require extensive monitoring. Both systems require significant manual cleaning or intervention to maintain the components that contact the liquid.

Liquid overcoats tend to be slightly less expensive than laminates (6–18 cents per square foot). However, because currently available systems must be cleaned frequently and regularly monitored, these methods of using liquid overcoats are just as labor-intensive as the lamination methods, if not more labor-intensive.

Additionally, many of the overcoat formulations have residual odors before and/or after application, and some people find these odors offensive or even harmful.

Ultraviolet (UV) light curable liquid overcoats are also available, such as the overcoats commonly used to protect magazine covers. In such a UV-curable system, the liquid is first applied to the surface of the print and then cured to yield a solid, durable, protective coating. Because these liquids are widely used in large volumes for the magazine industry, their cost tends to be significantly lower than most other overcoat options. However, the systems used to apply such UV-curable overcoats tend to be more complicated and costly than other liquid overcoat systems, due to the multi-step application and cure process. Additionally, many of the overcoat formulations have strong odors, some of which are harmful or offensive to people. Furthermore, there are potential safety problems associated with the handling of the potentially hazardous liquids used in this process.

Malhotra (U.S. Pat. No. 5,612,777 assigned to Xerox), Tutt & Tunney (U.S. Pat. No. 5,847,738 assigned to Eastman Kodak Co.) and Tyagi et al. (U.S. Pat. No. 5,783,348 assigned to Eastman Kodak Co.) disclose methods of applying a clear, scratch-resistant, lightfast, toner coating onto printed areas. Malhotra describes photocopied color images created by first, depositing color toner on a charge retentive surface; second, depositing a clear polymer toner material onto the charge retentive surface; and third, transferring and fusing the color toner and clear polymer toner material onto a substrate. Tutt & Tunney describe a process of depositing and fusing a clear polymer toner on inkjet printed areas. Tyagi et al. describes a similar process for coating clear toner over silver halide printed areas.

Similar electrostatic coating methods are also commonly used in the commercial painting industry to powder coat products, parts, or assemblies. One powder coating method charges a powdered paint using an air gun outfitted with an electrode before spraying the charged paint onto an electrically grounded object. Alternatively, an electrically grounded object may be immersed in a charged, fluidized bed of paint particles (typically referred to as "fluidized bed powder coating").

Another Malhotra patent (U.S. Pat. No. 5,906,905 assigned to Xerox) discloses a method of creating photographic quality prints using imaging such as xerography or ink jet by, first, reverse reading toner printed areas on a transparent substrate and then adhering the transparent substrate to a coated backing sheet, coated with a polymeric lightfastness material.

The application of thermal film material on a thermally printed substrate is also disclosed. Nagashima (U.S. Pat. No. 4,738,555 assigned to Toshiba) discloses the use of a thermal printhead to thermally transfer a transparent protective layer of wax, vinyl chloride, vinyl acetate, acrylic resin, styrene or epoxy onto the thermally printed medium substrate.

Tang et al. (U.S. Pat. No. 5,555,011 assigned to Eastman Kodak) discloses a means to ensure that a thermal film that is being applied to a thermally printed surface has a clean break at the edge of the transfer. It describes a thermal film transfer method having a transport system which moves a dye-donor web and a receiver medium (i) in a forward direction along their respective paths past a thermal head, so that heat from the thermal head causes an area of the thermal film material coating between leading and trailing edges to transfer from the dye-donor web to the receiver medium and (ii) in a reverse direction along their respective paths such that the area of the thermal film material which is transferred to the receiver medium breaks cleanly at the trailing edge from a non-transferred area of the thermal film material that remains on the dye-donor web as the web support separates from the medium.

Abe et al. (U.S. Pat. No. 5,954,906 assigned to Canon) discloses a method for protecting and covering a printed material on a substrate with a pressure-sensitive protective covering material with at least (a) a first flexible substrate, (b) an adhesive layer, (c) a solid resin layer, and (d) a second flexible substrate, stacked in this order.

The packaging, printing, and decorating industry uses colored ribbons, known as thermal transfer foils, hot stamping foils, roll foils, and transfer printing foils, for marking or decorating. This market uses solid fill colored ribbons or uniquely patterned ribbons to emboss lettering, patterns, barcodes, or insignias on wood, paper, leather, plastic, fabric, or metal parts. Examples include holograms on credit cards, metalized insignias on baseball cards, corporate logos on business cards, or colored or metalized designs on greeting cards. The hot stamp foiling process involves the transfer of the coatings from a carrier ribbon onto a substrate via a combination of heat and pressure.

SUMMARY OF THE INVENTION

The present invention relates to a method of creating a non-thermally printed medium with a protective overcoat comprising:

providing a non-thermally printed medium with a printed area;

applying a protective overcoat over the printed area of the medium by applying heat and pressure to a donor web having a carrier side comprising a carrier material and a transfer side comprising a protective overcoat material, wherein heat and pressure applied to the transfer side facilitate release of a section of the transfer side, so that the section of the transfer side is applied over the printed area of the medium.

The present invention also relates to an overcoat for a non-thermally printed medium, the non-thermally printed medium to which the overcoat is applied, and the donor web from which the overcoat is applied to the non-thermally printed medium made by the above-described method.

The present invention relates to an apparatus comprising:

a donor web having a carrier side comprising carrier material and a transfer side comprising protective overcoat material, a means of applying a protective overcoat a printed area of a non-thermally printed medium, by applying heat and pressure to the donor web, wherein the heat and pressure facilitate release of a section of the transfer side so that the section of the transfer side to is applied over the printed area of the medium.

DETAILED DESCRIPTION OF THE INVENTION

Figure 1:
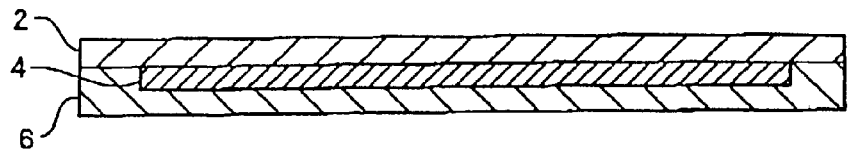
FIG. 1 is a cross sectional view of an overcoated photo quality print having a medium (6) having a printable surface on to which an area (4) is printed and a thermal transfer overcoat (2) is also transferred to the printable surface of the medium to cover the printed area.

The present invention provides a means of creating inexpensive, durable digital prints that can compete or improve upon the quality and durability of traditional silver halide prints or other coating protected digital prints. This invention uses a thermally-transferred, transparent overcoat, which is applied as a colorless transparent film, to protect the printed area on the media.

The overcoated media of the present invention is obtained by transferring the thermal transfer overcoat from a donor web which has a top side of carrier ribbon material, the carrier ribbon material anchoring the bottom side which has at least one layer of overcoat materials. The bottom side may include a release layer, a thermal transfer material, and an adhesive layer. The thermal transfer material may be a single layer or include multiple material layers. As the donor web is heated and pressed into contact with the printable surface of a medium, the thermal transfer overcoat is transferred onto the printable surface of the medium.

The clear thermal transfer overcoat of the present invention improves print area quality and increases durability of the printed areas. For example, the overcoat provides good protection against various substances that might spill, either in the form of liquid or dry spills, on the surface of a print. Non-limiting examples of substances which the present invention would protect against would be water, alcohol, ink, coffee, soda, ammonia based or other cleaning liquids, food stains (e.g. mustard, chocolate, berry), and dirt.

The clear, thermal transfer overcoat can be applied in a way that provides, for example, a gloss finish or a matte finish. This may be achieved through the control of the application temperature, pressure, and speed. In addition, the creation of patterns using a thermal bar as the heating element can be used to create unique matte or patterned finishes.

The composition of the overcoat can be formulated to target specific properties. It can be formulated to achieve a specific gloss or matte level, and to enhance the gloss uniformity or the matte uniformity. It can also be formulated with materials or additives which improve the printed area, specifically, indoor light fade resistance, UV light fade resistance, resistance to water and other liquids, vapor resistance, scratch resistance and blocking resistance. In a preferred embodiment, the overcoat can also be formulated to have a colorless or color-tinted appearance, provide a flexible, conformable coating, decrease the required dry time, optimize the adhesion of the thermal transfer overcoat to the medium, optimize the release of the thermal transfer overcoat from the donor web, and minimize the adhesion of the thermal transfer overcoat to the base.

Within, the thermal transfer overcoat, there can be layers that enhance the transfer to the printable surface of the medium. These additional layers can include, for example, an adhesive layer positioned as the exterior layer of the thermal transfer overcoat. The primary function of this adhesive layer is to enhance the fixation of the thermal transfer overcoat onto the printable surface of the medium. Another example is a release layer positioned on the interior surface of the thermal transfer overcoat next to the interior surface of the carrier ribbon material. The adhesive layer and the release layer can also include additives which enhance indoor and UV lightfade resistance, resistance to water and other liquids, vapor resistance, scratch resistance and blocking resistance in the printed areas on the printable surface.

Non-limiting examples of light resisting additives that can be added to the thermal transfer overcoat to be transferred to the printable surface of the medium in the form of a clear overcoat are the hindered amine series light stabilizers. The hindered amine series light stabilizer can include commercially available hindered amine series light stabilizers having a property of dispersing within a region which it can react with a dye molecule and deactivate an active species. Preferable specific examples of such hindered amine series light stabilizers include TINUVIN 292, TINUVIN 123, and TINUVIN 144 (trademarks, produced by Japan Ciba-Geigy Company).

Besides the hindered amine series light stabilizers, the thermal transfer overcoat can also include UV absorbers, which can include, but are not limited to, the benzophenone series UV absorbers, benzotriazole series UV absorbers, acetanilide series UV absorbers, cyanoacrylate series UV absorbers, and triazine series UV absorbers. Specific preferred examples are commercially available acetanilide series UV absorbers such as Sanduvor UVS powder and Sanduvor 3206 Liquid (trademark names, produced by Sando Kabushiki Kaisha); and commercially available benzotriazole series UV absorbers such as TINUVIN 328, TINUVIN 900, TINUVIN 1130, and TINUVIN 384 (trademark names, produced by Japan Ciba-Geigy Company), and Sanduvor 3041 Dispersion (trademark name, produced by Sando Kabushiki Kaisha).

Non-limiting examples of liquid resistance additives or vapor resistance additives that can be added to the thermal transfer overcoat, to be transferred to the printable surface of the medium in the form of a clear overcoat are additives that decrease the wetability of the surface by decreasing the surface energy, thereby repelling liquids such as (but not limited to) water from the surface. These additives may include the family of fluoro-surfactants, silanes, siloxanes, organosiloxanes, siliconizing agents, and waxes or combinations thereof.

In addition to the use of additives to increase the liquid or vapor resistance, the formulation of the thermal transfer overcoat can provide improvements. Individual thin layers may develop pits or pin holes in their surface during their coating to the carrier. These holes provide avenues for liquid or vapor to travel down to the printed surface. By increasing the number of layers used to create the thermal transfer material and the total overcoat, the probability of a pinhole extending all the way through the entire layer stack is decreased. In addition, this allows the individual layers to be optimized for a unique performance attribute, whereas it may not be possible to acquire as large a range of attributes from a single layer. For example, an upper layer may be optimized for gloss, and it may cover a lower layer optimized for light fade resistance. The combination of the two may be the same thickness as a single layer that has lower gloss and inferior light fade and liquid resistant properties due to the tradeoffs associated with formulating that single layer. A single optimized thermal transfer material layer may be feasible as well.

One of the layers in the thermal transfer overcoat may consist of material having barrier properties (i.e., having very low permeability toward gases (e.g., oxygen or water vapor)). Examples of the most widely used materials with barrier properties are co-polymers of acrylonitrile or co-polymers of vinylidene chloride or vinylidene fluoride. Use of materials with barrier properties in the overcoat makes it possible to dramatically increase protection of the overcoated print from humidity and fade (partially caused by oxidation of the colorants.

The total thermal transfer overcoat should be flexible. Materials should be selected such that the final film conforms to the surface of the medium. During application, the material should not crack or break, thereby leaving blemishes, area degradations, or exposed medium. Further, the material should conform and adhere to the surface of the media during bending, flexing, or folding, as might be experienced during typical handling.

The present invention makes possible very thin individual layers on a medium that can be applied either as transparent or opaque layers. Thus, in one embodiment of the invention it is possible to apply thin protective layers as both undercoating and overcoating to a medium. Providing protective coatings to both media surfaces achieves improved durability and protection of print qualities without sacrificing good optical or media qualities in the finished product.

The prints of the present invention include a medium material as a substrate for receiving an area. Preferred embodiments of the present invention use a completely opaque medium material, but the medium may also be transparent. Alternative embodiments use a medium having a transparent or opaque border or frame to provide additional advantages to the final printed product, such as enhanced aesthetic appeal or additional structural support (such as by a cardboard frame).

The medium material can be selected from, for example, but is not limited to, premium quality photo paper such as HP Premium Photo Paper used for digital color photographic printing or HP Premium Heavyweight Paper used for quality plain paper printing.

The medium material may also include or be coated with materials which increase adhesion of inkjet dyes or pigments, increase adhesion of the overcoat material, optimize print quality, increase resistance to scratches, increase resistance to fading, increase resistance to moisture, or increase resistance to UV light. Such materials include, but are not limited to polyesters, polystyrenes, polystyrene-acrylic, polymethyl methacrylate, polyvinyl acetate, polyolefins, poly(vinylethylene-co-acetate), polyethylene-co-acrylics, amorphous polypropylene and copolymers and graft copolymers of polypropylene.

The medium material can also influence the level of gloss, the level of matte, the gloss uniformity, or the matte uniformity of the overcoated print. For example, a smooth surface on the medium material will facilitate good, voidless adhesion of the overcoat, since the film is not required to conform to the topography of an uneven or pitted surface. This will result in a uniformly glossy overcoat surface, one that has good resistance to moisture and increased light fade resistance due to the complete sealing of the surface from air or liquids, especially (but not limited to) water-based liquids or their vapors.

The medium material typically comprises a sheet having first and second surfaces in the shape of a square or rectangle, though the shape of the medium is not limited in any way and the size and thickness of the medium may vary. For example, commonly available printer papers may be used or a medium material of a non-paper material but of the same size and thickness as commonly available printer papers (e.g., letter size, legal size, A4, etc.) can be used. Other embodiments may use media suitable for use in large-scale imaging applications, such as applications using the Hewlett-Packard Model 2500 Designjet inkjet printer typically used in engineering, architecture, or cartography applications.

One of ordinary skill in the art will understand that a printed area can be applied to a printable surface of the medium material using commonly known and available means, such as inkjet or electrostatic printing. The printing processes of the present invention can include, but are not limited to inks conventionally used in inkjet, offset, and gravure. In addition, it includes the imaging means used in liquid electrophotography, electrophotography, and conventional photography. When inkjet printing is used, for example, both dye based and pigment based inkjets inks can be used, but the invention is not limited to such inks. These inks, toners, or imaging materials may be formulated to optimize the adhesion of the thermal transfer overcoat to the printed surface of the media.

If inkjet printing is used, excess moisture from the inks may impede adhesion or uniform dispersion of the overcoat on the printed surface. As long as the media is dry enough for proper adhesion, moisture may dissipate through the overcoat surface over time, since the overcoat is so thin. If excess moisture is trapped between the medium material and the overcoat, the printed area may bloom or blur at its edges. In a preferred embodiment of the present invention, an optimum combination of ink, media and thermal transfer overcoat is achieved which minimizes excess moisture in the printing process, thus avoiding accumulations of condensed liquid on the medium. Alternatively, to eliminate such excess moisture, the area may be dried.

An optional dryer can be used to ensure the ink is dry enough to facilitate coating adhesion before overcoating. As non-limiting examples, the dryer can dry the wet printing area using convection, conduction or irradiation (for example, in a preferred embodiment, with any of the following: a radiative heating apparatus, a conductive heating apparatus, a convective blowing apparatus, an infrared apparatus, an infrared radiative heating element, an ultraviolet apparatus and a microwave apparatus). As long as the media is dry enough for proper adhesion, excess moisture may dissipate through the overcoat surface over time, since the overcoat is so thin.

The printed area may also be preheated prior to coating, to facilitate the transfer of the overcoat material. If a dryer is used, the drying step may provide this preheating.

In a preferred embodiment of the present invention, the heating element used for transfer is selected from a group consisting of a heated roller, a ceramic heat bar, or a thermal printhead. A heated roller, similar to what is used in most commercial laminators or many electrophotograpic fusers, provides a good means of providing uniform, continuous, full width transfer of the overcoat. A ceramic heat bar, similar to what is used in many monochrome electrophotographic fusers (a.k.a. instant-on fusers), also provides a good means of providing uniform, continuous, full width transfer of the overcoat. In addition, ceramic elements have a lower thermal mass than a typical heated roller, thus they quickly reach the desired transfer temperature and quickly cool following transfer, thereby enhancing energy efficiency and reducing start-up time. A thermal printhead, similar to what is used in thermal transfer or dye sublimation printers or faxes, provides a good means of providing continuous or intermittent, full width or discrete, transfer of the overcoat. The heating element can be rigid, or it may be compressible, with the compression level influencing the nip area.

In another preferred embodiment of the present invention, the medium is positioned over a base, and the heating element and base are pressed towards each other to create a nip area. The base can be rigid, or it can be compressible, with the compression level influencing the nip area. The base may be coated with a non-stick (non-wetting), heat-resistant surface. A solid lubricant can be used to provide this surface. The solid lubricant may be a fluororesin, fluorocarbon, or fluoropolymer coating such as (poly)-tetrafluoroethylene (PTFE), perfluoroalkoxy (PFA), fluorinated ethylene propylene (FEP), ethylene tetrafluoroethylene (ETFE), ethylene chlorotrifluoroethylene (ECTFE), polyvinylidene fluoride (PVDF), with trade names such as Teflon, Silverstone, Fluoroshield Magna, Cerm-a-lon, Magna TR, Navalon, Apticote, or Edlon. In addition a replenished liquid lubricant, such as silicone oil, can be used to provide this non-stick surface.

In a preferred embodiment of the present invention, the heating element, the base and the donor web span beyond the width of the printable surface of the medium to be coated. During application, the heating element and base maintain a constant nip force and area across the donor web, which is in contact with the medium. Since the donor web and nip area extend beyond the print sides, full coating to all print edges is insured. The non-stick base surface ensures that the overcoat is only transferred to the printable surface and not to the surrounding non-stick surface of the base. Only that portion of the thermal transfer overcoat that touches the printable surface separates from the donor web. The rest, including the thermal transfer material overcoat portion extending beyond the edges, remains connected to the donor web. The present design also provides the added feature in that one source of overcoat can be used to coat any print size narrower than the source, without the need for post process trimming.

When not being applied, the heating element may be removed from the donor web and base surfaces, thereby discontinuing transfer and allowing form feed of the medium under the heater element. Also, application of the coating can be discontinued by reducing the temperature of the heating element or by reducing the nip force, which can be facilitated by raising the heating element or the combination of the heating element and donor web off the media surface.

Figure 5:
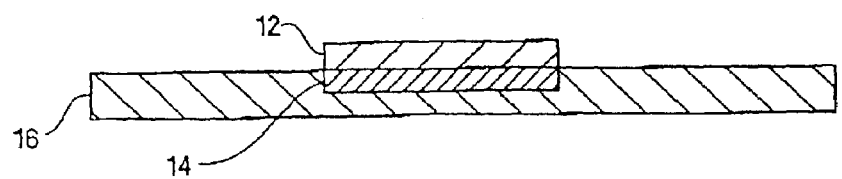
FIG. 5 is a cross sectional view of a preferred embodiment of overcoated print, in which the area of the printable surface with a printed area is overcoated with a thermal transfer material while the area of the printable surface without a printed area is not overcoated.

In addition to limiting the area of transfer of the thermal transfer overcoat to the printable surface by providing a non-stick surface on the base under the printable surface, the area of the printable surface that actually receives a transferred section of the thermal transfer overcoat can be further limited to a specific portion of the printable surface by limiting the section of the thermal transfer overcoat to the area in which heat and pressure is applied. This can be accomplished with the use of a thermal printhead, as used in thermal transfer printers. For example, selected printed areas, such as color printed areas, on the printable surface can be overcoated while other printed areas, such as black and white text, can remain uncoated. Such an embodiment is shown in FIG. 5. Such selective overcoating of discrete areas on media is not feasible with traditional laminates and traditional laminating processes nor other digital coating processes.

Also in a preferred embodiment of the present invention, the speed of the donor web through the heating element is maintained at the same speed as the medium, thus ensuring a uniform coverage. A source roll of donor web is located upstream of the heating element and a take-up roll is located downstream. The source roll is torque limited with a slip clutch or similar device to tension and present the thermal transfer material on the donor web, and to allow the unrolling of the donor web concurrent with the medium during application but ensuring that uncontrolled unrolling does not occur. The take-up roll provides enough torque to peel the donor web from the coated medium's surface, but not enough to pull the donor web/medium combination through the applicator or to distort the coating in the applicator. The take-up mechanism thus peels the donor web from the coated medium, collects the donor web, and helps maintain the uniform tension on the donor web during application.

Assuming the printed area on the medium can be dried quickly enough through ink and media optimization or post print dryers, a thermal transfer overcoat module can be offered to use, for example, as a plug-in module for a printer. An inkjet printer in combination with a thermal transfer overcoat module would provide a compact reliable system for creating durable photo-quality prints. Alternatively, rather than having the thermal transfer overcoating capability offered as part of a plug-in module which can either be included or not included with the printer, a printer can be built which completely incorporates the thermal transfer overcoating function into an integrated printing and coating printer. Alternatively, a stand-alone coater can be used, which allows the user to hand load the already printed sheets to be overcoated.

Thermal transfer overcoating is an improvement over lamination as previously disclosed. In the present invention a thermal transfer material overcoat is transferred onto the medium surface only at the locations that are subjected to the contact pressure and heat. Thus, it disengages from the donor web as it transfers and only the thermal transfer material and not the donor web is attached to the medium surface. There is clean separation of the donor web and the medium material at all edges of the print. In contrast, in previously disclosed laminates, the transferred laminate is still attached to the overcoat supply source, until separated by a manual or automated trimming step. In the present invention, there is no need for a secondary manual or automated trimming step to disconnect the thermal overcoat supply source (the donor web) from the overcoated print. This also facilitates the easy feeding of material and clearing of paper jams.

In addition, in the present invention, because the thermal transfer material separates from the donor web at the media's edges, the alignment of film to media is not as critical as alignment of laminate to media. For example, if a laminate is misaligned, excess material extends beyond the edge of the print, requiring additional post lamination trimming. If a thermal transfer overcoat is misaligned to the media, the overcoat film of the thermal transfer material still separates from the donor web at the edges of the prints and no additional trimming is required.

Another advantage of the thermal transfer overcoats of the present invention is that the overcoats are thinner than most laminates. Covering the area with a thermal transfer overcoat offers the advantage of providing an intimate, gap-free, bubble free bond with the medium. The differences in the coefficient of thermal expansion between the overcoat and the media will result in less severe curling of thermal transfer coated prints as compared to laminated ones. In addition, a thin film provides a more photo-realistic appearance, whereas typical laminates provide a plastic or artificial appearance.

A print of the present invention is illustrated in a cross-sectional view by FIG. 1. The print comprises medium (6) having two surfaces, a first surface and a second surface. In FIG. 1, the first surface is the unprinted side of the medium which may or may not have a printable surface, while the second surface—to which a printed area is applied—is the printed side with a printable surface. A printed area (4) is applied to the second surface of the medium (6). A thermal transfer material overcoat (2), as disclosed herein, is also applied to the second surface of the medium material and at least partly, but preferably completely, covers the printed area. The printed area can be viewed through the thermal transfer material overcoat. As such, the medium material and thermal transfer material overcoat house and protect the printed area.

Prints embodied in the present invention can be produced by a variety of apparatuses. Such apparatuses typically comprise the elements illustrated in FIG. 2, though it will be appreciated that other apparatuses may be employed without departing from the scope and true spirit of the present invention.

Figure 2:
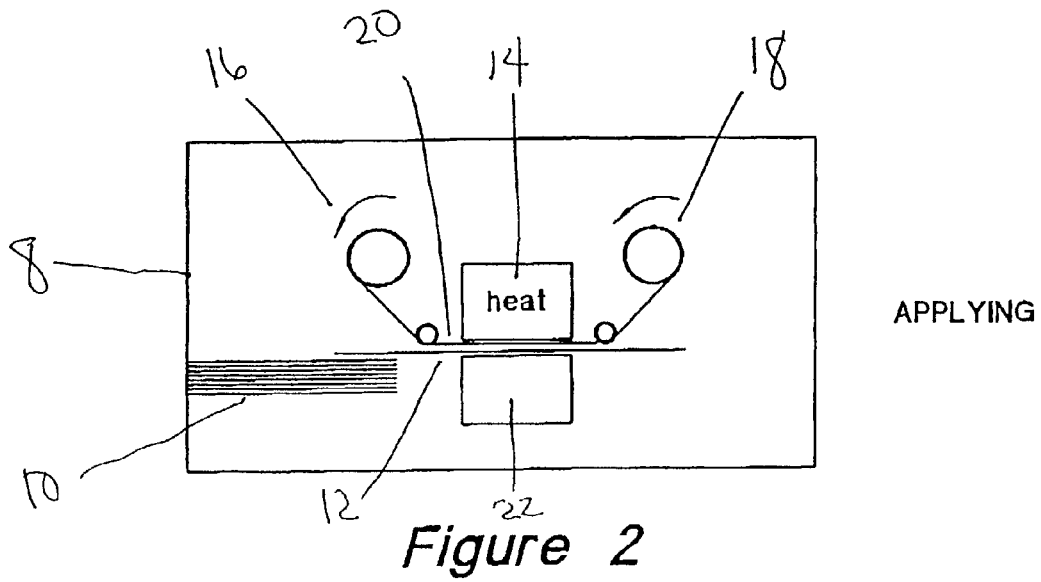
FIG. 2 is schematic view of a preferred embodiment of the apparatus of the present invention, showing a frame (8) housing a loader (10), a sheet of the medium (12), a heating element (14), a source roll (16), a take-up roll (18), a tensioned section of the donor web (20) and a base (22).

The apparatus of FIG. 2 generally comprises a frame (8) housing a loader (10). The loader (10) comprises a mechanism similar to known mechanisms for loading paper in printers or photocopiers including, but not limited to, openings for handfeeding individual sheets of media, loading bins capable of holding several sheets of media, or combinations thereof.

Once a sheet of the medium material (12) is loaded into the system, the take up roll (18), or other similar means, tensions a section (20) of the donor web coming from the source roll (16), and at least one heating element (14) heats the segment of the donor web and presses it against the medium (12) positioned on a base (22) (which in a preferred embodiment can be in the form of at least one roller or a platen) to transfer a segment of the thermal transfer material layer of the donor web onto the sheet of the medium material (12) as it moves through the system. At the end of the medium (12) the heating element (14) or other similar means, is raised, or the base (22) is lowered, so that heat or pressure are no longer provided to the donor web. The thermal transfer overcoat separates from the donor web during transfer up to the edges of the medium, with the thermal transfer overcoat adhering to the surface of the medium where the pressure and heat were applied and continuing to be attached to the donor web beyond the edges of the medium.

Figure 3:
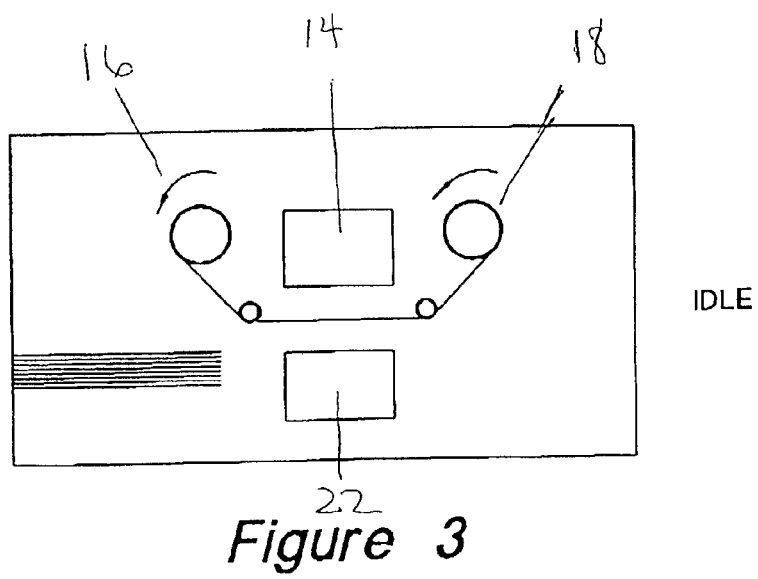
FIG. 3 is an alternate schematic view of the apparatus of FIG. 2 with the donor web (18) tensioned in a position away from the medium.

FIG. 3 shows the apparatus of FIG. 2 with the ribbon handler (e.g. the take-up roll (18) and source roll (16)) tensioning the donor web in a position away from and no longer abutting the heating element (14) and base (22). In this position, no thermal transfer overcoat transfers onto a medium.

Figure 4:
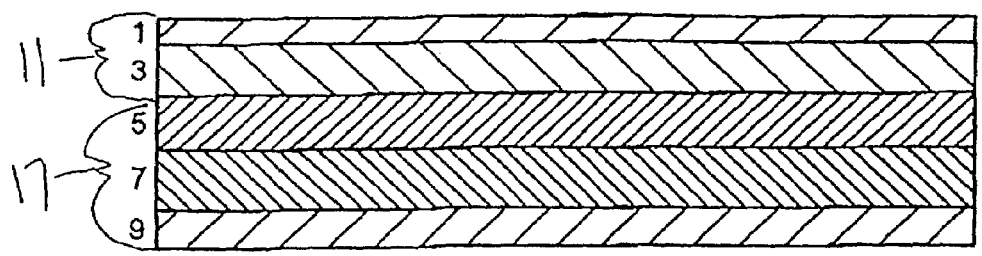
FIG. 4 is a cross sectional view of a preferred embodiment of the donor web of the present invention.

A cross sectional view of a preferred embodiment of the donor web of the present invention is illustrated by FIG. 4. The donor web has a carrier side (11) with lubricant layer (1) and a layer of carrier ribbon material (3) and a transfer side (17) containing the thermal transfer overcoat in which the thermal transfer material (7) (which in a preferred embodiment can be a thermoplastic resin, such as an acrylic, polyolefin, polyester and/or their derivatives or combinations thereof) itself is sandwiched between a release layer (5) and an adhesive layer (9). The lubricant layer (1) is on the exterior surface of the carrier side (11). The lubricant layer (1) reduces friction between the donor web and the heating element The adhesive layer (9) is on the exterior surface of the transfer side(17) and helps fix the layers of the transfer side (17) as an overcoat on the printable surface of the medium. The release layer (5) is on the interior surface of the transfer side (17) and promotes the release of the layers of the transfer side (17) from adhering to the carrier side (11) to adhering to the printable surface of the medium. In one preferred embodiment, the release layer (5) is wax.

FIG. 5 is a cross sectional view of a preferred embodiment of overcoated print, in which the area of the printable surface (16) with a printed area (14) is overcoated with a thermal transfer layer (12) while the area of the printable surface (16) without a printed area (14) is not overcoated.

While the foregoing invention has been described in some detail for purposes of clarity and understanding, it will be clear to one skilled in the art from the reading of this disclosure that various changes in form and detail can be made without departing from the true scope of the invention.

What is claimed is:

1. A method of obtaining a transparent protective overcoat on an inkjet printed surface of a medium, comprising:
    applying an uncut transparent protective overcoat material to the inkjet printed surface of the medium, the surface comprising at least one inkjet ink printed image and the medium being supported by a base, the uncut transparent protective overcoat material being applied by heat and pressure uniformly to a section of a carrier side of a donor web having a carrier side and a transfer side, the carrier side comprising carrier ribbon material and the transfer side comprising the uncut transparent protective overcoat material, the donor web unrolled from a source roll upstream and taken up by a takeup roll downstream, the source roll and takeup roll tensioning the donor web, and torque from the takeup roll pulling the donor web to release the section of transparent overcoat material adhering to the surface of the medium from the carrier ribbon material; and
    wherein the released section, defined by edges where the heat and pressure are applied, is cleanly separated at the edges from the carrier ribbon material without trimming; and
    wherein at least a portion of an exterior surface of the base comprises a surface material resistant to transparent overcoat material adhering to the exterior surface; and
    wherein excess moisture from the at least one inkjet printed image dissipates through the section of transparent overcoat material.

2. The method of claim 1, wherein the at least one inkjet ink printed image is printed with water-based ink.

3. The method of claim 1, wherein the at least one inkjet ink printed image is printed with ink selected from the group consisting of dye-based ink and pigment-based ink.

4. The method of claim 1, wherein, before applying the uncut transparent protective overcoat material to the inkjet printed surface of the medium, the at least one inkjet ink printed image on the under-surface is dried with a drier selected from the group consisting of a radiative heating apparatus, a conductive heating apparatus, a convective blowing apparatus, an infrared apparatus, an infrared radiative heating element, an ultraviolet apparatus and a microwave apparatus.

5. A method of obtaining a transparent protective overcoat on a medium, comprising:
    applying an uncut transparent protective overcoat material to the surface of the medium, the medium being supported by a base, the uncut transparent protective overcoat material being applied by heat and pressure uniformly to a section of a carrier side of a donor web having a carrier side and a transfer side, the carrier side comprising carrier ribbon material and the transfer side comprising the uncut transparent protective overcoat material, the donor web unrolled from a source roll upstream and taken up by a takeup roll downstream, the source roll and takeup roll tensioning the donor web, and torque from the takeup roll pulling the donor web to release the section of transparent overcoat material adhering to the surface of the medium from the carrier ribbon material; and
    wherein the released section, defined by edges where the heat and pressure are applied, is cleanly separated at the edges from the carrier ribbon material without trimming; and
    wherein at least a portion of an exterior surface of the base comprises a surface material resistant to transparent overcoat material adhering to the exterior surface; and
    wherein excess moisture from the at least one inkjet printed image dissipates through the section of transparent overcoat material.

6. An apparatus comprising:
    a donor web having a carrier side comprising carrier ribbon material and a transfer side comprising uncut transparent protective overcoat material, the transfer side applied as an uncut transparent protective overcoat material to an inkjet printed surface of a medium, the donor web being unrolled from a source roll upstream and taken up by a takeup roll downstream, the source roll and takeup roll tensioning the donor web, and torque from the takeup roll pulling the donor web to release the transparent overcoat material adhering to the inkjet printed surface of the medium from the carrier ribbon material, a heating/pressure element to apply the transparent overcoat material to the inkjet printed surface of the medium, the heating/pressure element comprising either a surface with a size and shape equivalent to the surface of the medium or at least one heat roller applying heat and force to the whole area of the surface of the medium, the die or roller applying heat and pressure uniformly to the donor web, the heat and pressure going through the transfer side of the donor web to adhere a section of the transparent overcoat material to the inkjet printed surface of the medium, the section of the transparent overcoat material being positioned against the surface of the medium and the medium being supported by a base; and wherein the released section, defined by edges where the heat and pressure are applied, is cleanly separated at the edges from the carrier ribbon without trimming; and wherein at least a portion of an exterior surface of the base comprises a surface material resistant to the transparent overcoat material adhering to the exterior surface; and wherein the transparent overcoat material is a vapor-permeable barrier, excess moisture dissipating freely through the section of transparent overcoat material applied to the inkjet printed surface of a medium.

7. The apparatus of claim 6, wherein the at least one inkjet ink printed image is printed with water-based ink.

8. The apparatus of claim 6, wherein the at least one inkjet ink printed image is printed with ink selected from the group consisting of dye-based ink and pigment-based ink.

9. The apparatus of claim 6, wherein, before applying the uncut transparent protective overcoat material to the inkjet printed surface of the medium, the at least one inkjet ink printed image on the surface is dried with a drier selected from the group consisting of a radiative heating apparatus, a conductive heating apparatus, a convective blowing apparatus, an infrared apparatus, an infrared radiative heating element, an ultraviolet apparatus and a microwave apparatus.

10. An apparatus comprising:
a donor web having a carrier side comprising carrier ribbon material and a transfer side comprising uncut transparent protective overcoat material, the transfer side applied as an uncut transparent protective overcoat material to a surface of a medium, the donor web being unrolled from a source roll upstream and taken up by a takeup roll downstream, the source roll and takeup roll tensioning the donor web, and torque from the takeup roll pulling the donor web to release the transparent overcoat material adhering to the surface of the medium from the carrier ribbon material, a heating/pressure element to apply the transparent overcoat material to the surface of the medium, the heating/pressure element comprising either a surface with a size and shape equivalent to the surface of the medium or at least one heat roller applying heat and force to the whole area of the surface of the medium, the die or roller, the heating/pressure element surface or roller applying heat and pressure uniformly to the donor web, the heat and pressure going through the transfer side of the donor web to adhere a section of the transparent overcoat material to the surface of the medium, the section of the transparent overcoat material being positioned against the surface of the medium and the medium being supported by a base; and wherein the released section, defined by edges where the heat and pressure are applied, is cleanly separated at the edges from the carrier ribbon without trimming; and wherein at least a portion of an exterior surface of the base comprises a surface material resistant to the transparent overcoat material adhering to the exterior surface; and wherein the transparent overcoat material is a vapor-permeable barrier, excess moisture dissipating freely through the section of transparent overcoat material applied to the inkjet printed surface of a medium.

* * * * *